2,731,799

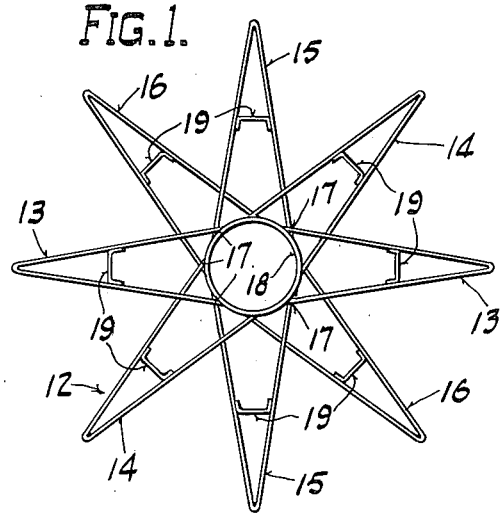
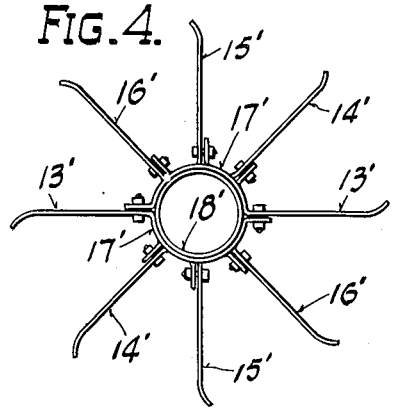
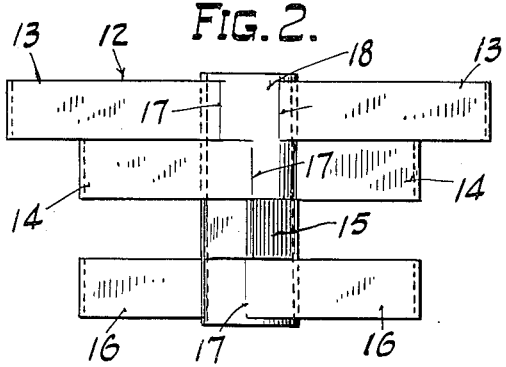
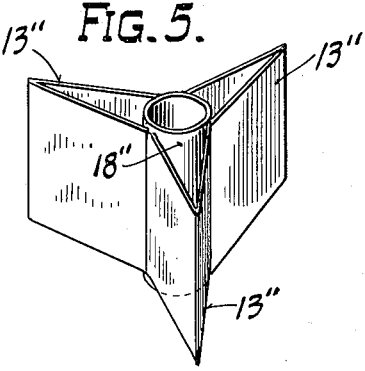
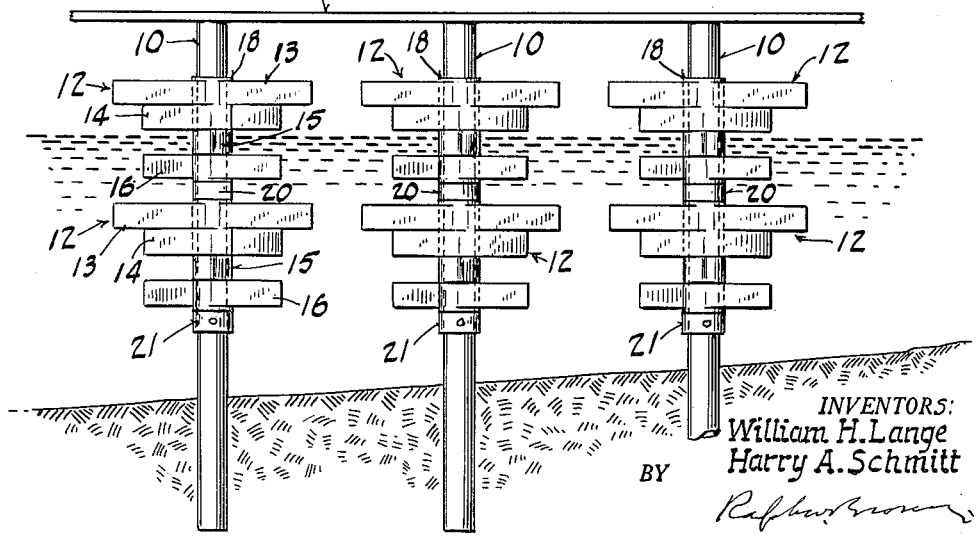
INVENTORS:
William H. Lange
Harry A. Schmitt

United States Patent Office 2,731,799
Patented Jan. 24, 1956

SHORE PROTECTIVE DEVICES

William H. Lange, Milwaukee, and Harry A. Schmitt, Shorewood, Wis.

Application April 13, 1950, Serial No. 155,646

3 Claims. (Cl. 61—4)

This invention relates to shore protective devices of the beach-building type.

In our copending application, Serial No. 108,918, filed August 6, 1949, now Patent No. 2,662,378, we have disclosed a shore protective jetty capable of inducing an effective beach-building process by stilling the shore waters to a degree such as to bring about the release and deposit therefrom of sand and other solid matter normally suspended therein. The jetty therein described includes a multiplicity of motion damping elements having radiating projections and free to turn or swing about a vertical axis as the motion of the water may dictate.

An object of the present invention is to improve the construction and effectiveness of motion damping elements of the character mentioned.

More specific objects and advantages will appear, expressed or implied, from the following description of illustrative embodiments of the invention.

In the accompanying drawings:

Figure 1 is a plan view of a motion damping element constructed in accordance with the present invention.

Fig. 2 is a view in side elevation thereof.

Fig. 3 is a fragmentary view in side elevation of a jetty equipped with motion damping elements such as shown in Figs. 1 and 2.

Fig. 4 is a plan view of another form of motion damping element embodying the invention.

Fig. 5 is a perspective view of another embodiment of the invention.

The several forms of motion damping elements herein illustrated are intended for use in various forms of jetties or other shore protective devices, such for instance as that partially illustrated in Fig. 3. The device therein shown comprises a series of spaced pillars 10 arranged to extend outward from the shore. In this instance the pillars 10 are in the form of piles driven into place or otherwise anchored to the underlying bed. The upper ends of the pillars 10 are shown rigidly interconnected by a suitable structure 11.

Each of the several pillars 10 provides support for one or more motion damping elements. In this instance two such elements 12 are shown mounted one above another on each pillar, although the number employed may vary with conditions such as the depth of the water. In water of substantial depth the best results are obtained by mounting a series of such elements 12 on each pillar, the series extending from a point a little above the bottom to a level somewhat above the normal water level. In this instance each of the elements 12 shown in Fig. 3 are of the form shown in detail in Figs. 1 and 2, although other forms, such for instance as that shown in Fig. 4 or Fig. 5, may be used.

The motion damping element shown in Figs. 1 and 2 comprises several pairs of oppositely directed arms 13, 14, 15 and 16 symmetrically disposed about a common center and radiating therefrom, the several pairs of arms being disposed in different vertical planes. In this instance each arm comprises a strip of sheet metal bent into V-form with the inner ends 17 thereof welded or otherwise attached to a metal tube 18. Each arm is preferably reinforced and stiffened by an intermediate cross member 19 welded thereto. The tube 18 constitutes a hub which may be loosely threaded onto a pillar 10, so as to permit the several arms to turn freely, as a unit, about the pillar, as the motion of the water may dictate. The units are preferably spaced by suitable means such as a collar 20, so that they may turn independently of each other, and a collar 21 fixed to each pillar 10 provides appropriate means for supporting the units thereon.

Constructed and arranged in the manner above described, the elements 12 have been found to be particularly effective in bringing about the release and deposit of solid matter suspended in the water. This is undoubtedly due to the effectiveness of these elements in dissipating the wave motion and the damping of the littoral currents. Moreover, the comparative quiet of the water contained between the side walls of each of the several arms 13, 14, 15 and 16 is a condition highly conducive to a prompt discharge of suspended matter therefrom.

The element shown in Fig. 4 comprises a similar arrangement of pairs of diametrically disposed radiating arms 13', 14', 15' and 16', attached at different levels to an upright supporting tube or hub 18'. In this instance each arm comprises a metal strip fashioned at its inner end to partially encircle the hub 18', and bolted or otherwise attached to the mating part 17' of the other arm of the pair, so as to form a clamp collar 17' by which both arms are fixed to the hub 18'. The several pairs of arms are arranged in stack formation along the hub 18', as in the device shown in Fig. 2. The hub 18' is preferably of a size to be loosely mounted on one of the pillars 10 so that the several arms are free to turn, as a unit thereabout; and although the individual arms are rather stiff, the thickness of the metal of which they are formed is preferably such as to provide some flexibility.

The element shown in Fig. 5 comprises a set of three angularly spaced radiating arms 13'' symmetrically disposed about a supporting hub 18''. In this instance each arm 13'' is formed of a metal sheet bent into V-form with the end edges thereof welded or otherwise attached to the hub 18'' in much the same manner as in the device of Figs. 1 and 2.

Various changes may be made in any of the embodiments of the invention hereinabove described without departing from or sacrificing the advantages of the invention as defined in the appended claims.

We claim:

1. A shore protective device comprising a plurality of fixedly positioned vertical pillars arranged adjacent the shore, and a plurality of water engaging elements mounted in superimposed relationship and independently rotatable on each of said pillars for damping the motion of the water whereby the motion of the water is stilled to release and deposit solid matter suspended therein, each of said elements comprising a series of elongated arms arranged in tiers radiating from and symmetrically disposed about a central axis.

2. A shore protective device comprising a plurality of fixedly positioned vertical pillars arranged adjacent the shore, and a plurality of water engaging elements mounted in superimposed relationship and independently rotatable on each of said pillars for damping the motion of the water whereby the motion of the water is stilled to release and deposit solid matter suspended therein, each of said elements comprising a series of elongated arms arranged in tiers radiating from and symmetrically disposed about a central axis, said arms of each tier being arranged in angularly spaced relationship.

3. A shore protective device comprising a plurality of fixedly positioned vertical pillars arranged adjacent the shore, and a plurality of water engaging elements mounted in superimposed relationship and independently rotatable on each of said pillars, each of said elements comprising pairs of oppositely directed arms arranged in tiers radiating from a central axis, said pairs of arms of each tier being angularly spaced with respect to the arms of the adjacent tier, said elements serving to dampen the motion of the water to thereby effect the release and deposit of solid matter suspended therein.

References Cited in the file of this patent

UNITED STATES PATENTS

| | | |
|---|---|---|
| 1,967,759 | Snyder | July 24, 1934 |
| 2,224,851 | Lea | Dec. 17, 1940 |
| 2,341,515 | Rehfeld | Feb. 15, 1944 |

FOREIGN PATENTS

| | | |
|---|---|---|
| 1,203 | Great Britain | 1860 |
| 3,771 | Great Britain | 1887 |
| 395,006 | France | Oct. 8, 1908 |
| 517,707 | France | 1920 |
| 755,166 | France | 1933 |